(12) United States Patent
Webster

(10) Patent No.: US 10,132,434 B2
(45) Date of Patent: Nov. 20, 2018

(54) HOSE COUPLING ASSEMBLY FOR SUBSEA APPLICATIONS

(71) Applicant: Parker-Hannifin Corporation, Cleveland, OH (US)

(72) Inventor: Paul Howard Webster, Missouri City, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 40 days.

(21) Appl. No.: 15/219,553

(22) Filed: Jul. 26, 2016

(65) Prior Publication Data

US 2017/0146172 A1 May 25, 2017

Related U.S. Application Data

(60) Provisional application No. 62/258,663, filed on Nov. 23, 2015.

(51) Int. Cl.
  *F16L 33/207* (2006.01)
  *E21B 1/00* (2006.01)
  *F16L 17/067* (2006.01)

(52) U.S. Cl.
  CPC ............ *F16L 33/2076* (2013.01); *E21B 1/00* (2013.01); *F16L 17/067* (2013.01)

(58) Field of Classification Search
  CPC . F16L 33/207; F16L 33/2071; F16L 33/2073; F16L 33/2076
  USPC ........................................................ 285/256
  See application file for complete search history.

(56) References Cited

U.S. PATENT DOCUMENTS

| | | | |
|---|---|---|---|
| 3,185,500 A * | 5/1965 | Luther | F16L 33/2076 285/256 |
| 3,549,180 A * | 12/1970 | MacWilliam | F16L 33/2076 285/256 |
| 3,552,781 A | 1/1971 | Helland | |
| 4,366,841 A | 1/1983 | Currie et al. | |
| 4,834,139 A | 5/1989 | Fitzgibbons | |
| 4,880,390 A | 11/1989 | Brackmann, Jr. et al. | |

(Continued)

FOREIGN PATENT DOCUMENTS

| | | | | |
|---|---|---|---|---|
| FR | 1419827 A | * | 12/1965 | .......... F16L 33/2073 |
| FR | 2780764 A1 | * | 1/2000 | .......... F16L 33/2076 |

(Continued)

*Primary Examiner* — David Bochna
(74) *Attorney, Agent, or Firm* — Renner, Otto, Boisselle & Sklar, LLP

(57) ABSTRACT

A hose assembly includes a fitting including a fitting end received in a shell. A sealing element is located at a junction between the fitting and the shell. The first fitting end has a nipple and the shell has an angled end that define a sealing space, and the sealing element is positioned within the sealing space. External pressure at the junction compresses the sealing element within the sealing space to form an energized seal. The shell may include a first shell end and a second shell end, the fitting end of the fitting being received within the first shell end of the shell. The shell my include a plurality of barbs that extend radially inward from an inner diameter of the shell that can grip into a hose, and a barb located closest to the shell end extends radially inward a smaller distance than other barbs to provide a barrier against ingression of contaminants.

19 Claims, 3 Drawing Sheets

(56) References Cited

U.S. PATENT DOCUMENTS

| | | | | |
|---|---|---|---|---|
| 5,255,944 A | * | 10/1993 | Blin | F16L 33/2076 |
| | | | | 285/256 |
| 5,417,461 A | * | 5/1995 | Dougherty | F16L 33/2076 |
| | | | | 285/256 |
| 5,553,896 A | * | 9/1996 | Woodward | F16L 25/025 |
| | | | | 285/256 |
| 6,764,106 B1 | | 7/2004 | Smith et al. | |
| 6,827,375 B2 | | 12/2004 | Fraser | |
| 7,384,074 B2 | * | 6/2008 | He | F16L 33/2078 |
| | | | | 285/256 |
| 8,042,252 B2 | | 10/2011 | Conley et al. | |
| 8,628,118 B2 | | 1/2014 | Bobenhausen | |
| 8,770,630 B2 | | 7/2014 | Zakrzewski et al. | |
| 8,840,152 B2 | | 9/2014 | Carcagno et al. | |
| 8,888,140 B2 | | 11/2014 | Stroempl et al. | |
| 8,950,788 B2 | | 2/2015 | Dianetti et al. | |
| 2003/0001385 A1 | * | 1/2003 | Favre | F16L 33/2076 |
| | | | | 285/256 |
| 2004/0245774 A1 | | 12/2004 | Eccleston | |
| 2006/0131878 A1 | * | 6/2006 | Wulf | F16L 33/2076 |
| | | | | 285/256 |
| 2008/0036203 A1 | * | 2/2008 | Piccinali | F16L 33/2076 |
| | | | | 285/256 |
| 2010/0194100 A1 | | 8/2010 | Koch | |

FOREIGN PATENT DOCUMENTS

| | | | | |
|---|---|---|---|---|
| GB | 2205372 A | * | 12/1988 | F16L 33/2076 |
| JP | 2008151196 A | * | 7/2008 | F16L 33/2073 |

* cited by examiner

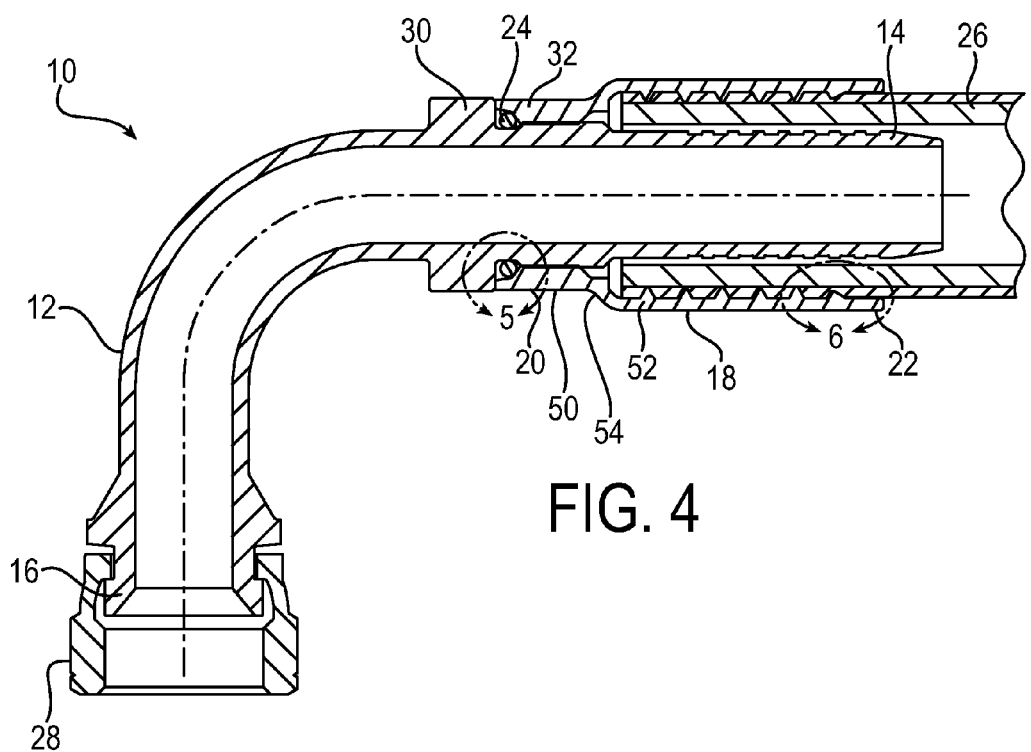
FIG. 4
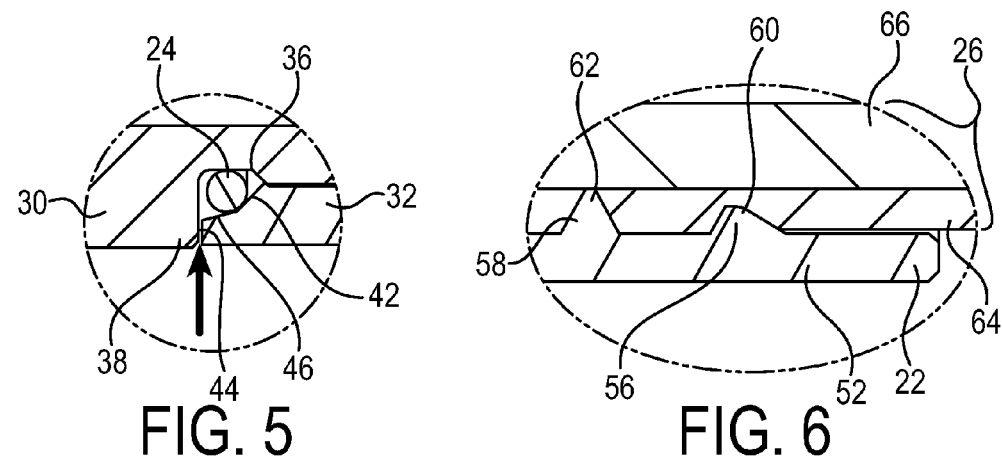
FIG. 5
FIG. 6

HOSE COUPLING ASSEMBLY FOR SUBSEA APPLICATIONS

RELATED APPLICATION DATA

This application claims the benefit of U.S. Provisional Application No. 62/258,663 filed Nov. 23, 2015, which is incorporated herein by reference.

FIELD OF INVENTION

The present invention relates generally to subsea hose couplings or hose fittings suitable for use in deep subsea applications, such as for blow-off preventers (BOP), hydraulic hoses, flying leads, hotline hoses, and hoses used with subsea umbilicals.

BACKGROUND OF THE INVENTION

Hydraulic hose couplings may be subjected to substantial pressures. In one particular exemplary application, hydraulic hoses may be employed in deep undersea drilling operations, including in blow-off preventers that act as a safety feature that closes off a drilling operation in case of a catastrophic failure. Hose couplings in undersea drilling operations may experience enormous high external pressures, such as about 500 psi and above. At such pressures, there is a danger of ingression of seawater into the hose construction via the coupling, which overtime can corrode and damage the hose and hose coupling. Ultimately, the corrosion can result in failure of the hose coupling.

SUMMARY OF THE INVENTION

Aspects of the invention include a hose coupling assembly having enhanced sealing configurations. The present invention substantially precludes ingression of seawater into the hose construction via the coupling, and thereby substantially reduces the propensity for corrosion and damage to the hose and hose coupling. The present invention, therefore, increases the longevity and performance of the hose coupling assembly.

In exemplary embodiments, the hose assembly includes a fitting including a first fitting end and a shell, the first fitting end of the fitting being received within the shell. A sealing element is located at a junction between the fitting and the shell. The first fitting end has a nipple and the shell has an angled end that define a sealing space, and the sealing element is positioned within the sealing space. External pressure at the junction compresses the sealing element within the sealing space to form an energized seal between the fitting and the shell. The nipple may include a stepped recess on an outer diameter of the first fitting end, and a collar that extends radially outward from the stepped recess such that the outer diameter of the fitting is greater at the collar than at the stepped recess. The stepped recess and collar result in a geometry suitable for enhanced compression of the sealing element within the sealing space to form the energized seal.

In exemplary embodiments, the shell may include a first shell end and a second shell end, the first fitting end of the fitting being received within the first shell end of the shell. The shell further may include a first portion having a first diameter, a second portion having a second diameter greater than the first diameter in a non-coupling position, and a shoulder that connects the first portion to the second portion. The second portion has a plurality of barbs that extend radially inward from an inner diameter of the shell, and a barb located closest to the second shell end extends radially inward a smaller distance than others of the plurality of barbs. A hose portion may be provided, which has an outer sheath that encloses an inner hose portion. The hose portion is positioned between an outer diameter of the first fitting end of the fitting and an inner diameter of the second portion of the shell. In a hose coupling process, the second portion of the shell is crimped radially inward about the shoulder to a coupling position, and in the coupling position the barb closest to the second shell end extends into the sheath but not into the inner hose portion, and others of the plurality of barbs extend through the sheath and into the inner hose portion.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 4 is a drawing depicting a cross-sectional view of an exemplary embodiment of the hose coupling assembly of FIG. 1, with the additional component of a hose portion.

FIG. 5 is a drawing depicting a close-up view of a sealing portion of the hose coupling assembly as depicted in FIG. 4.

FIG. 6 is a drawing depicting a close-up view of a fitting portion of the hose coupling assembly as depicted in FIG. 4.

DETAILED DESCRIPTION

Figure 1:
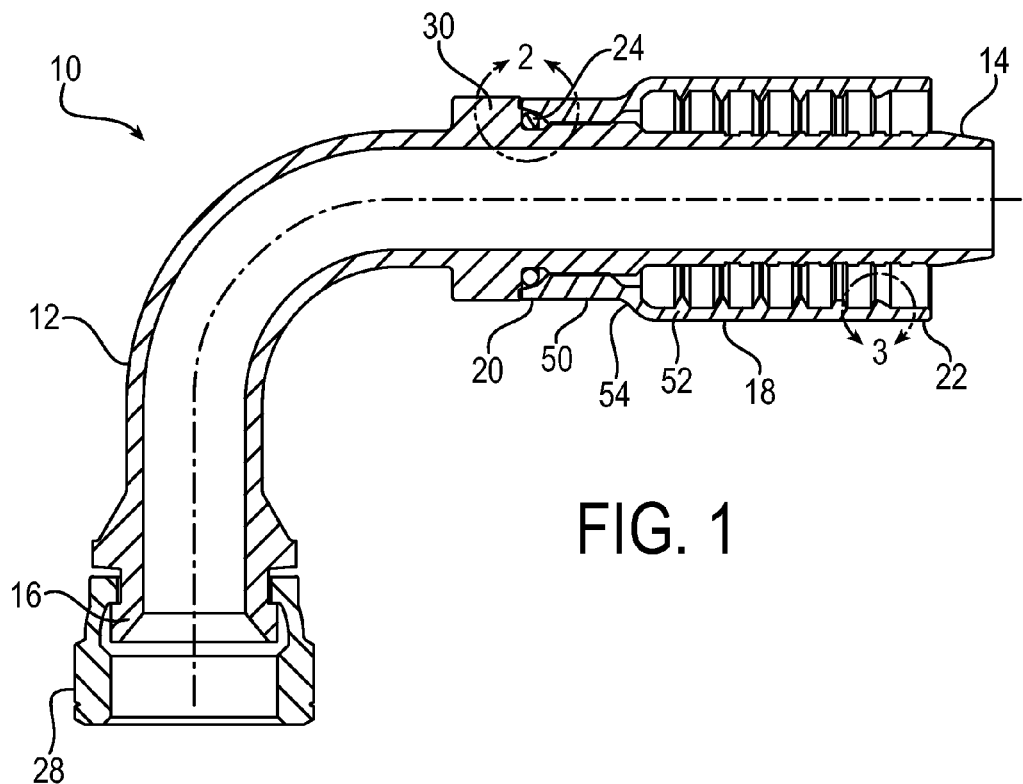
FIG. 1 is a drawing depicting a cross-sectional view of an exemplary embodiment of a hose coupling assembly in accordance with embodiments of the present invention.

Embodiments of the present invention will now be described with reference to the drawings, wherein like reference numerals are used to refer to like elements throughout. It will be understood that the figures are not necessarily to scale.

The present invention is a hose coupling assembly that has an enhanced resistance to water ingression resulting from high external pressures as compared to conventional configurations. FIG. 1 is a drawing depicting a cross-sectional view of an exemplary embodiment of a hose coupling assembly 10 in accordance with embodiments of the present invention. FIG. 4 is a drawing depicting a cross-sectional view of an exemplary embodiment of the hose coupling assembly of FIG. 1, with the additional component of a hose portion.

The hose coupling assembly 10 includes a fitting 12 including a first fitting end 14 and a second fitting end 16. The hose coupling assembly 10 further includes a shell 18 including a first shell end 20 and a second shell end 22. The fitting 12 is received within the shell 18 with the first fitting end 14 of the fitting being received through the first shell end 20 of the shell. A sealing element 24 is located at a junction between the fitting 12 and the shell 18. As seen particularly in FIG. 4, the hose coupling assembly 10 may receive a hose portion 26 that is positioned between an outer diameter of the first fitting end and an inner diameter of the shell. The hose portion 26 defines a flow pathway for a flow of fluid, such as hydraulic fluid, to and/or from a source or reservoir (not shown). Fluid may further flow through a fluid pathway defined by the hose coupling assembly 10. The second fitting end 16 may be configured as a connector for connecting the hose coupling assembly 10 to drilling equipment 28 for the flow of hydraulic fluid to and/or from the equipment.

Figure 2:
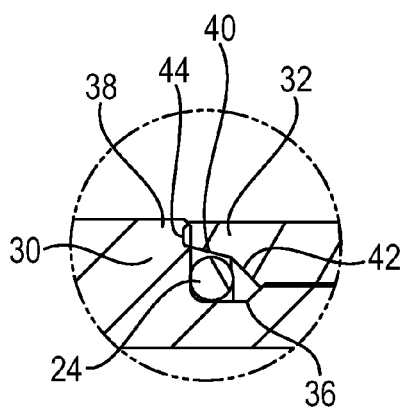
FIG. 2 is a drawing depicting a close-up view of a sealing portion of the hose coupling assembly of FIG. 1.

FIG. 2 is a drawing depicting a close-up view of a sealing portion of the hose coupling assembly of FIG. 1. FIG. 5 is a drawing depicting a close-up view of a sealing portion of the hose coupling assembly of as depicted in FIG. 4 with the additional component of the hose portion. As seen particularly in such close-up views of FIGS. 2 and 5, the first fitting end 14 has a nipple 30, and the shell has an angled end 32 at the first shell end 20 that together define a sealing space. The sealing element 24 is positioned within the sealing space. There is generally a slight gap at the junction between the fitting and shell in the area of the sealing space. External pressure at the junction would tend to force seawater through such gap and into the coupling, as best depicted in the arrow shown in FIG. 5. With the configuration of the present invention, the external pressure compresses the sealing element 24 within the sealing space to form an energized seal between the fitting and the shell.

Again as seen particularly in the close-up views of FIGS. 2 and 5, in exemplary embodiments the nipple 30 may include a stepped recess 36 on an outer diameter of the first fitting end 14. The nipple 30 further may include a collar 38 that extends radially outward from the stepped recess, such that the outer diameter of the fitting is greater at the collar 38 than at the stepped recess 36. The first shell end 20 may be configured to have the angled end 32 of the shell that may include a first sloped segment 40 and a second sloped segment 42, with the two sloped segments having different slopes. The angled end 32 of the shell further may include a radially straight segment 44 that extends adjacent to the nipple of the fitting, particularly abutting against the collar 38. With such configuration, the sloped segments 40 and 42 in particular cooperate with the stepped recess 36 to form a seat against which the sealing element 24 is compressed under the external pressure.

The sealing element 24 may be configured as an o-ring seal. The sealing element 24 may be composed of any suitable elastomeric material that can compress without damage under the high external pressure to form an energized seal. Nitrile and urethane sealing elements have been shown to be particularly suitable for deep undersea uses. In use, the external pressure forces the sealing element inward particularly against the angled end 32 of the shell and the stepped recess 36 of the nipple to result in an effective seal.

Referring back again to FIGS. 1 and 4 depicting the broader hose coupling assembly 10, the shell 18 of the hose coupling assembly 10 may be segmented into a first portion 50 having a first diameter, a second portion 52 having a second diameter greater than the first diameter in a non-coupling position, and a shoulder 54 that connects the first portion 50 to the second portion 52. The second portion 52 has a plurality of barbs that extend radially inward from an inner diameter of the shell.

Figure 3:
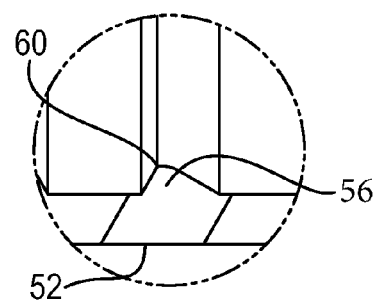
FIG. 3 is a drawing depicting a close-up view of a fitting portion of the hose coupling assembly of FIG. 1.

FIG. 3 is a drawing depicting a close-up view of a fitting portion of the hose coupling assembly of FIG. 1. FIG. 6 is a drawing depicting a close-up view of a fitting portion of the hose coupling assembly of as depicted in FIG. 4, with the additional component of the hose portion. As best seen in such close-up views of FIGS. 3 and 6, a barb 56 located closest to the second shell end 22 extends radially inward a smaller distance as compared to others 58 of the plurality of barbs. In a hose coupling process, the second portion of the shell 52 is crimped radially inward about the shoulder 54 to a second coupling position. In the second coupling position, the outer diameters of the first and second shell portions may be substantially the same, with the shoulder being essentially flattened. As further detailed below, in the coupling position the barbs interact with the hose portion 26, with the barbs gripping the hose portion to provide a strong connection that is sealed against the significant ingression of seawater into the hose coupling assembly.

Again, as best seen in the close-up views of FIGS. 3 and 6, the barb 56 located closest to the second shell end 22 has a rounded peak 60. Each of the others 58 of the plurality of barbs have a substantially triangular cross section with a pointed peak or a slightly flattened peak 62. FIG. 6 best shows the interactions of the barbs with the hose portion. The hose portion 26 may include an outer sheath 64 that encloses an inner hose portion 66, the hose portion 26 being positioned between an outer diameter of the first fitting end 14 of the fitting 12 and an inner diameter of the second portion 22 of the shell 18. In the hose coupling process, as referenced above the second portion of the shell is crimped radially inward about the shoulder to the coupling position.

Figure 7:
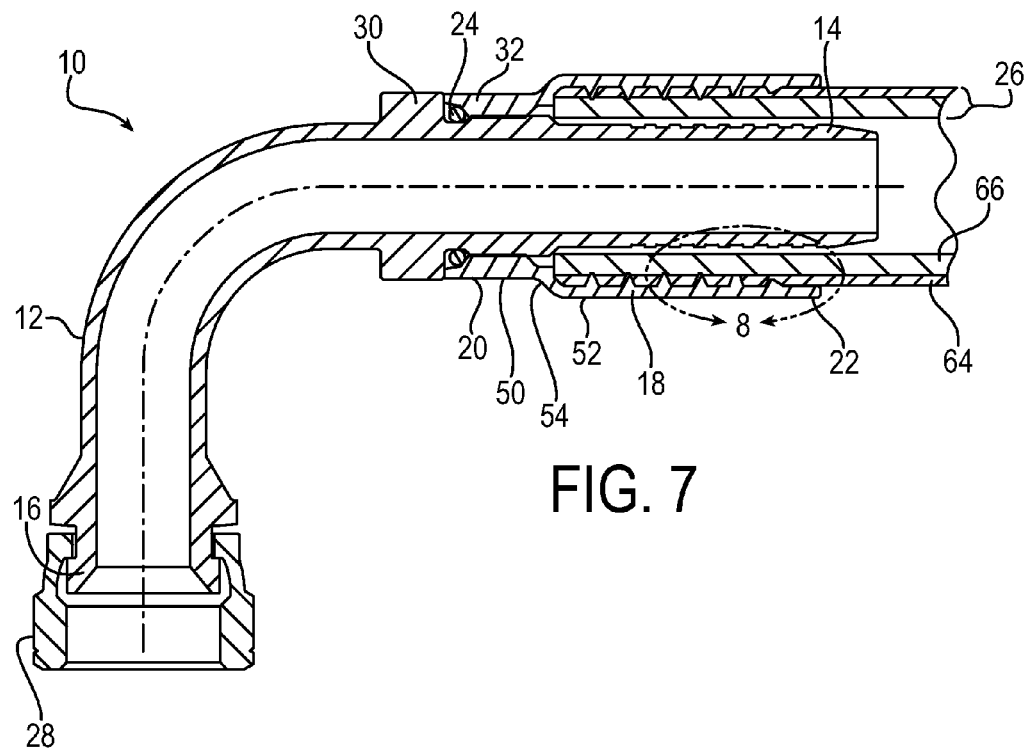
FIG. 7 is a drawing depicting a cross-sectional view of the exemplary hose coupling assembly of FIG. 4, with the assembly in the coupling position.
Figure 8:
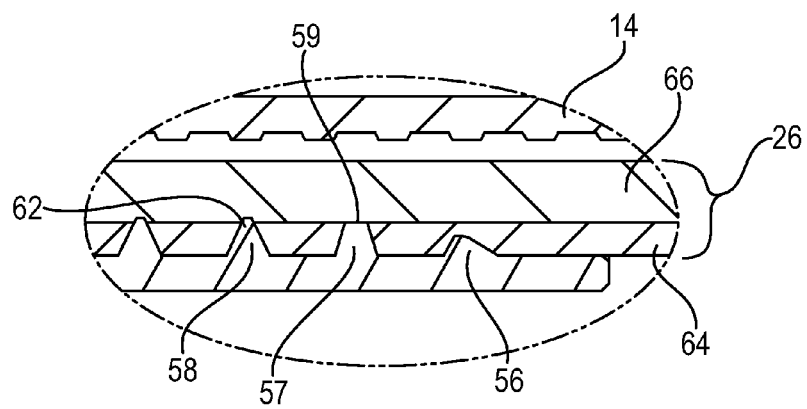
FIG. 8 is a drawing depicting a close-up view of a fitting portion of the hose coupling assembly in the coupling position as depicted in FIG. 7.

FIG. 7 is a drawing depicting a cross-sectional view of the exemplary hose coupling assembly of FIG. 4, with the assembly in the coupling position. FIG. 8 is a drawing depicting a close-up view of a sealing portion of the hose coupling assembly in the coupling position as depicted in FIG. 7. Accordingly, like reference numerals are used in FIGS. 7 and 8 as in FIGS. 4 and 6.

As referenced above, the hose portion 26 may include an outer sheath 64 that encloses an inner hose portion 66, the hose portion 26 being positioned between an outer diameter of the first fitting end 14 of the fitting 12 and an inner diameter of the second portion 22 of the shell 18. In the hose coupling process, the second portion of the shell is crimped radially inward about the shoulder to the coupling position. As seen in FIG. 7, and in the close-up view of FIG. 8 which bears similarity to FIG. 6, in such coupling position the barb 56 closest to the second shell end 22 extends into the outer sheath 64, but not into the inner hose portion 66. Also in the coupling position, others 58 of the plurality of barbs have peaks 62 that extend through the outer sheath 64 and into the inner hose portion 66. With such configuration, the shorter, rounded barb 56 acts as a sealing element that prevents any significant ingression of seawater into the hose coupling assembly. In addition, the longer, more pointed barbs 58 engage the inner hose portion 66 so as to provide a biting or gripping action resulting in a strong hose connection.

In the specific embodiment of FIGS. 7 and 8, an additional intermediate barb 57 may be positioned between the rounded barb 56 and the one of the pointed barbs 58 closest to the second shell end 22. As more readily seen in FIG. 8, the intermediate barb 57 may have a peak 59 that extends into the hose portion 26 farther inward than the rounded barb 56, but not as far inward as the peaks 62 of the pointed barbs 58. For example, the intermediate barb 57 may extend substantially through the entirely of the outer sheath 64, but not penetrate the inner hose portion 66. Including the intermediate barb 57 in addition to the rounded barb 56 further enhances the sealing function to prevents any significant ingression of seawater into the hose coupling assembly.

In addition, as referenced above and shown in FIG. 7, the second portion of the shell 52 has been crimped radially inward about the shoulder 54 to the second coupling position, and the outer diameters of the first and second shell portions are brought closer to each other as compared to the non-coupling position shown in FIG. 4, and may be substantially the same with the shoulder being essentially or close to flattened.

An aspect of the invention, therefore, is a hose coupling assembly. In exemplary embodiments, the hose assembly includes a fitting including a first fitting end, a shell, the first fitting end of the fitting being received within the shell, and a sealing element located at a junction between the fitting and the shell. The first fitting end has a nipple and the shell has an angled end that define a sealing space, and the sealing element is positioned within the sealing space. External pressure at the junction compresses the sealing element within the sealing space to form an energized seal between the fitting and the shell. Embodiments of the hose coupling assembly may include one or more of the following features, either individually or in combination.

In an exemplary embodiment of the hose coupling assembly, the nipple includes a stepped recess on an outer diameter of the first fitting end.

In an exemplary embodiment of the hose coupling assembly, the nipple further includes a collar that extends radially outward from the stepped recess, such that the outer diameter of the fitting is greater at the collar than at the stepped recess.

In an exemplary embodiment of the hose coupling assembly, the angled end of the shell includes first and second sloped segments that have different slopes.

In an exemplary embodiment of the hose coupling assembly, the angled end of the shell further includes a radially straight segment that extends from the first sloped segment and is positioned adjacent to the nipple of the fitting.

In an exemplary embodiment of the hose coupling assembly, the sealing element is an o-ring seal.

In an exemplary embodiment of the hose coupling assembly, the fitting has a second fitting end comprising a connector.

In an exemplary embodiment of the hose coupling assembly, the shell includes a first shell end and a second shell end, the first fitting end of the fitting being received within the first shell end of the shell. The shell further includes a first portion having a first diameter, a second portion having a second diameter greater than the first diameter in a non-coupling position, and a shoulder that connects the first portion to the second portion. The second portion has a plurality of barbs that extend radially inward from an inner diameter of the shell, and a barb located closest to the second shell end extends radially inward a smaller distance than others of the plurality of barbs.

In an exemplary embodiment of the hose coupling assembly, the barb located closest to the second shell end has a rounded peak.

In an exemplary embodiment of the hose coupling assembly, the others of the plurality of barbs have a substantially triangular cross section with a pointed peak or a flattened peak.

In an exemplary embodiment of the hose coupling assembly, the hose coupling assembly further includes a hose portion that has an outer sheath that encloses an inner hose portion, the hose portion being positioned between an outer diameter of the first fitting end of the fitting and an inner diameter of the second portion of the shell.

In an exemplary embodiment of the hose coupling assembly, in a hose coupling process the second portion of the shell is crimped radially inward about the shoulder to a coupling position, and in the coupling position the barb closest to the second shell end extends into the sheath but not into the inner hose portion.

In an exemplary embodiment of the hose coupling assembly, in the coupling position the others of the plurality of barbs extend through the sheath and into the inner hose portion.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hose coupling assembly comprising:
    a fitting including a first fitting end;
    a shell, the first fitting end of the fitting being received within the shell; and
    a sealing element located at a junction between the fitting and the shell;
    wherein the first fitting end has a nipple and the shell has an angled end that define a sealing space, the angled end including surfaces that are not at right angles to each other, and the sealing element is positioned within the sealing space; and
    wherein external pressure at the junction compresses the sealing element within the sealing space to form an energized seal between the fitting and the shell.

2. The hose coupling assembly of claim 1, wherein the nipple includes a stepped recess on an outer diameter of the first fitting end.

3. The hose coupling assembly of claim 2, wherein the nipple further includes a collar that extends radially outward from the stepped recess, such that the outer diameter of the fitting is greater at the collar than at the stepped recess.

4. The hose coupling assembly of claim 1, wherein the angled end of the shell includes first and second sloped segments that have different slopes.

5. The hose coupling assembly of claim 4, wherein the angled end of the shell further includes a radially straight segment that extends from the first sloped segment and is positioned adjacent to the nipple of the fitting.

6. The hose coupling assembly of claim 1, wherein the sealing element is an o-ring seal.

7. The hose coupling assembly of claim 1, wherein the fitting has a second fitting end comprising a connector.

8. A hose coupling assembly comprising:
a fitting including a first fitting end; and
a shell including a first shell end and a second shell end, the first fitting end of the fitting being received within the first shell end of the shell;
the shell further including a first portion having a first diameter, a second portion having a second diameter greater than the first diameter in a non-coupling position, and a shoulder that connects the first portion to the second portion;
wherein the second portion has a plurality of barbs that extend radially inward from an inner diameter of the shell,
the plurality of barbs comprises a barb located closest to the second shell end that extends radially inward a smaller distance than others of the plurality of barbs, and an intermediate barb that is located between the barb located closest to the second shell end and the others of the plurality of barbs, wherein the intermediate barb extends radially inward a smaller distance than the others of the plurality of barbs and a greater distance than the barb located closest to the second shell end; and
a sealing element located at a junction between the fitting and the shell;
wherein the first fitting end has a nipple and the first shell end is an angled end, wherein the nipple and the angled end define a sealing space, and the sealing element is positioned within the sealing space; and
wherein external pressure at the junction compresses the seal within the sealing space to form an energized seal between the fitting and the shell.

9. The hose coupling assembly of claim 8, wherein the barb located closest to the second shell end has a rounded peak.

10. The hose coupling assembly of claim 9, wherein the others of the plurality of barbs have a substantially triangular cross section with a pointed peak or a flattened peak.

11. The hose coupling assembly of claim 8, further comprising a hose portion that has an outer sheath that encloses an inner hose portion, the hose portion being positioned between an outer diameter of the first fitting end of the fitting and an inner diameter of the second portion of the shell.

12. The hose coupling assembly of claim 11, wherein in a hose coupling process the second portion of the shell is crimped radially inward about the shoulder to a coupling position, and in the coupling position the barb closest to the second shell end extends into the sheath but not into the inner hose portion.

13. The hose coupling assembly of claim 12, wherein in the coupling position others of the plurality of barbs extend through the sheath and into the inner hose portion.

14. The hose coupling assembly of claim 8, wherein the nipple includes a stepped recess on an outer diameter of the first fitting end.

15. The hose coupling assembly of claim 14, wherein the nipple further includes a collar that extends radially outward from the stepped recess, such that the outer diameter of the fitting is greater at the collar than at the stepped recess.

16. The hose coupling assembly of claim 8, wherein the angled end of the shell includes first and second sloped segments that have different slopes.

17. The hose coupling assembly of claim 16, wherein the angled end of the shell further includes a radially straight segment that extends from the first sloped segment and is positioned adjacent to the nipple of the fitting.

18. The hose coupling assembly of claim 8, wherein the sealing element is an o-ring seal.

19. The hose coupling assembly of claim 8, wherein the fitting has a second fitting end comprising a connector.

* * * * *